No. 893,989. PATENTED JULY 21, 1908.
E. S. EASTERDAY.
COW TAIL HOLDER.
APPLICATION FILED NOV. 12, 1907.
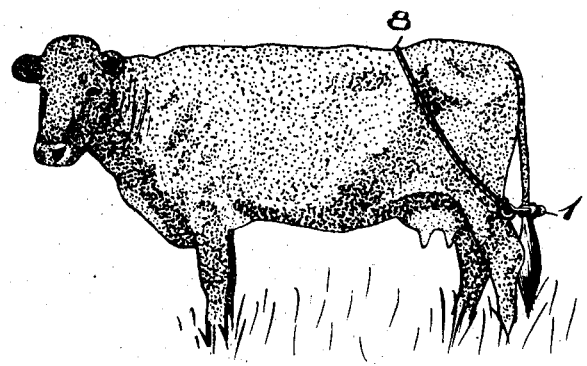
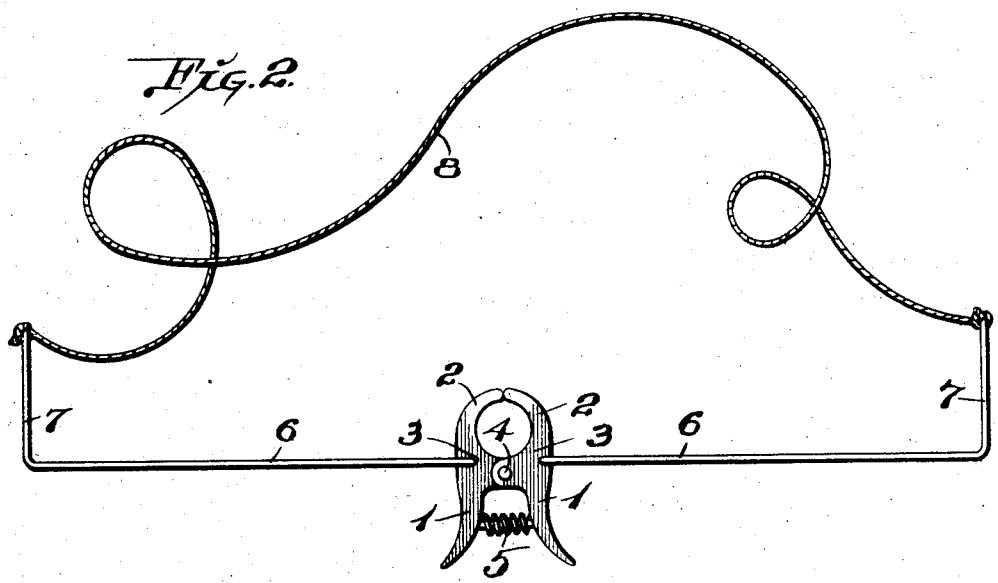
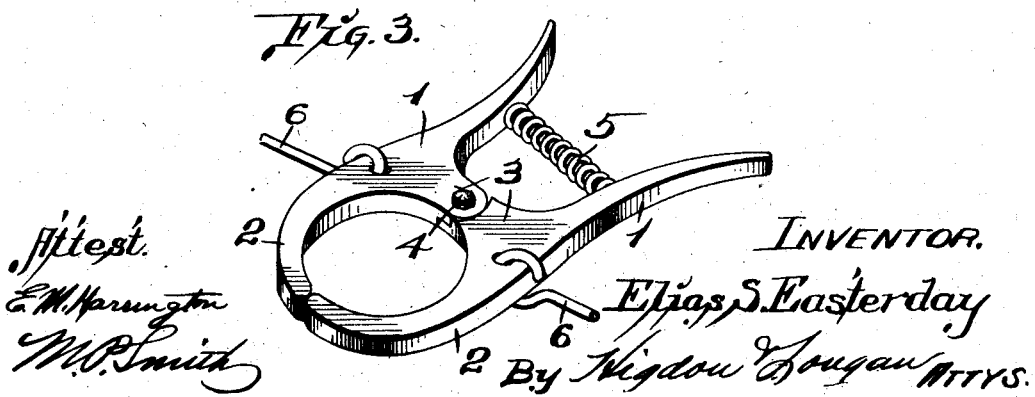
Attest:
E. W. Harrington
M. P. Smith
Inventor.
Elias S. Easterday
By Higdon & Longan Attys.

UNITED STATES PATENT OFFICE.

ELIAS S. EASTERDAY, OF NOKOMIS, ILLINOIS.

COW-TAIL HOLDER.

No. 893,989.      Specification of Letters Patent.      Patented July 21, 1908.

Application filed November 12, 1907. Serial No. 401,866.

*To all whom it may concern:*

Be it known that I, ELIAS S. EASTERDAY, a citizen of the United States, and resident of Nokomis, Montgomery county, Illinois, have invented certain new and useful Improvements in Cow-Tail Holders, of which the following is a specification, containing a full, clear, and exact description, reference being had to the accompanying drawings, forming a part hereof.

My invention relates to a cow tail holder, the object of my invention being to construct a simple, inexpensive device to be applied to a cow's tail to prevent the movement of the same; and the device is to be applied for use at the time the animal is being milked.

To the above purposes, my invention consists of certain novel features of construction and arrangement of parts, which will be hereinafter more fully set forth, pointed out in the claims, and illustrated in the accompanying drawings, in which:—

Figure 1 illustrates the device in position for use; Fig 2 is a view of the complete holder detached from the animal; Fig. 3 is a perspective view of the clamp which is engaged upon the tail of the animal.

Referring by numerals to the accompanying drawings: 1 designates a pair of curved handles, the forward ends of which are formed into a pair of semi-circular jaws 2; and formed integral with the handles are lugs 3, the meeting ends of which overlap, and passing through these overlapping ends is a pin 4, which pivotally connects the handles and jaws.

Arranged between the handles 1 is an expansive coil spring 5, which normally maintains the free ends of the jaws 2 in engagement with one another.

Pivotally connected to the handles 1, immediately opposite the lugs 3, are the inner ends of rods 6, the outer ends of which are bent forward, as designated by 7; and connected to the ends of the forwardly bent portions 7 are the ends of a cord or small rope 8, which is of sufficient length to extend upward over the back of the animal when the clamping device comprising the handles 1 and jaws 2 is engaged on the lower portion of the cow's tail.

When the device is applied for use, the rear portions of the handles 1 are moved toward one another, thus compressing the spring 5 and opening the jaws 2. The jaws are now engaged upon the cow's tail, and when the handles 1 are released, the coil spring 5 forces the rear ends of said handles apart, and consequently closes the jaws around the tail.

The rods 6 extend laterally from the handles 1, and the cord or rope 8 is positioned over the rear portion of the animal's body, and immediately in front of the hip bones.

A device of my improved construction is inexpensive, easily applied for use, effectually prevents switching of the tail, and in no wise interferes with the free movement of the animal's hind legs.

I claim:—

1. A cow tail holder, comprising a clamp, arms pivotally connected to the clamp and extending in opposite directions therefrom, and a flexible member connected to the ends of the arms and adapted to be passed over the rear portion of an animal's body.

2. A cow tail holder, comprising a pair of spring actuated clamping jaws adapted to engage an animal's tail, rods pivotally connected to said jaws and extending outward therefrom, the outer ends of which rods are bent at right angles relative to the body portions of the rods, and a flexible member connected to the bent end portions of the rods and adapted to be passed over the rear portion of an animal's body.

In testimony whereof, I have signed my name to this specification, in presence of two subscribing witnesses.

ELIAS S. EASTERDAY.

Witnesses:
     A. J. WILLIFORD,
     J. L. MANNING.